R. W. LYLE.
MEANS FOR SEPARATING STONES FROM CLAY.
APPLICATION FILED JULY 2, 1909. RENEWED FEB. 4, 1914.
1,092,780.
Patented Apr. 7, 1914.
6 SHEETS—SHEET 2.
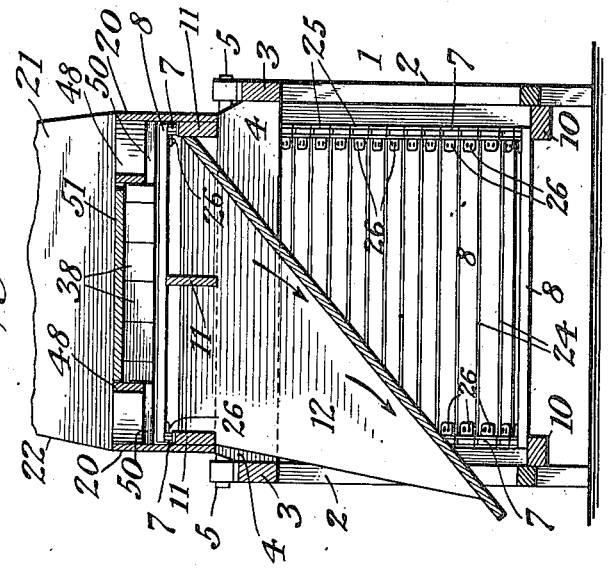
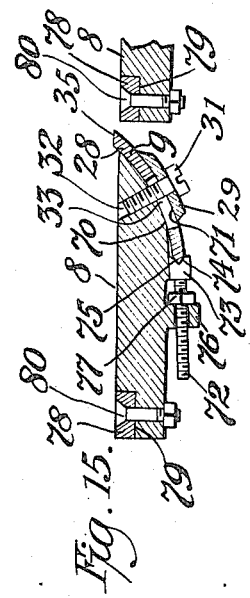
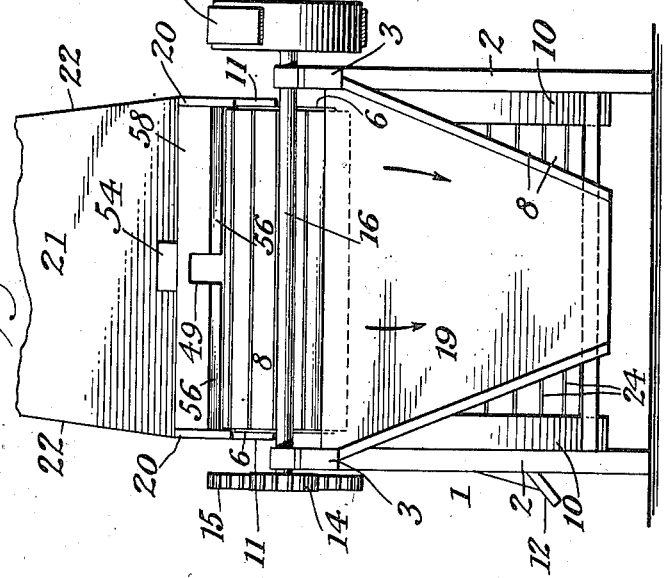
WITNESSES:
INVENTOR
Robt. W. Lyle,
BY Jos. Reed Littell
his ATTORNEY.

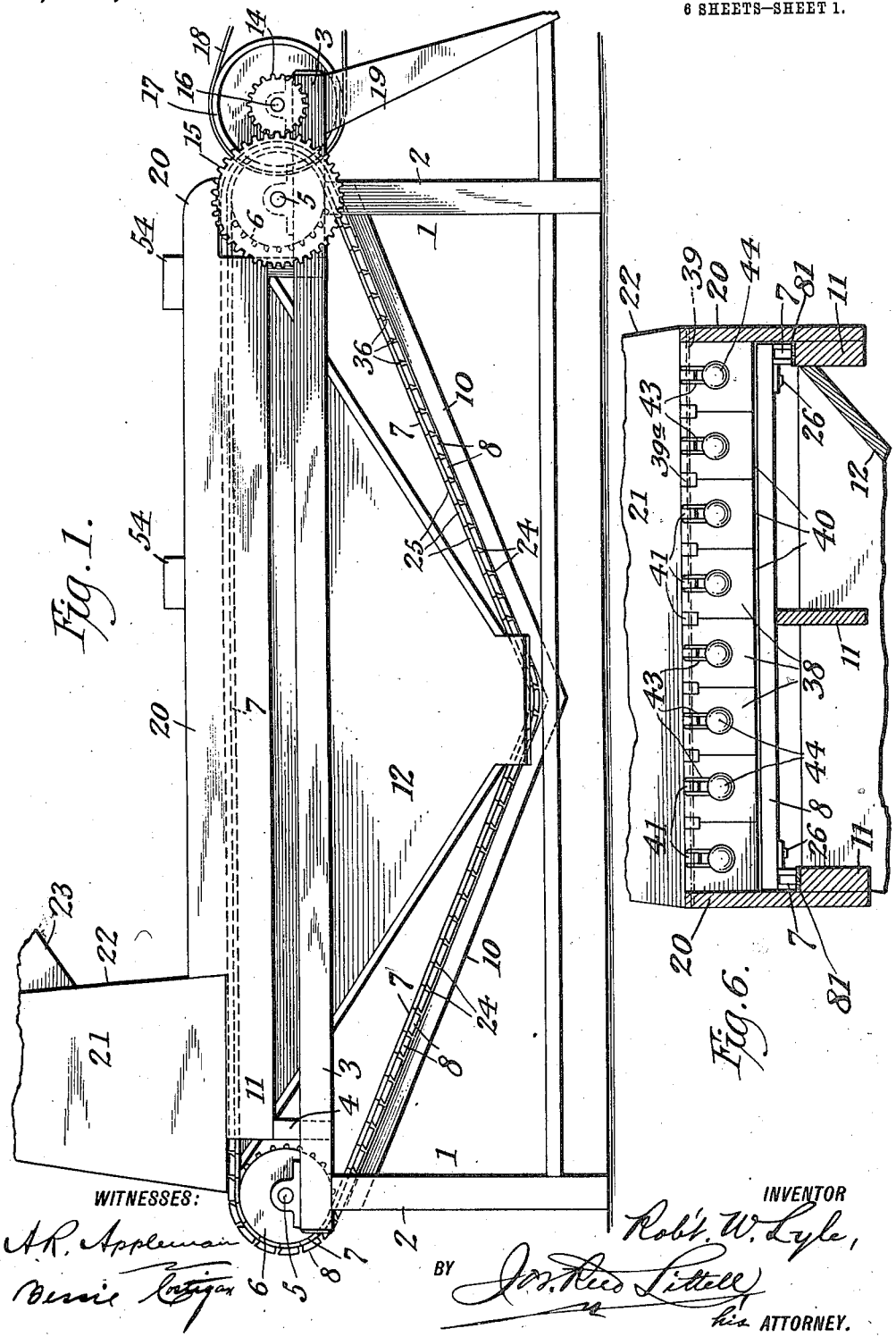

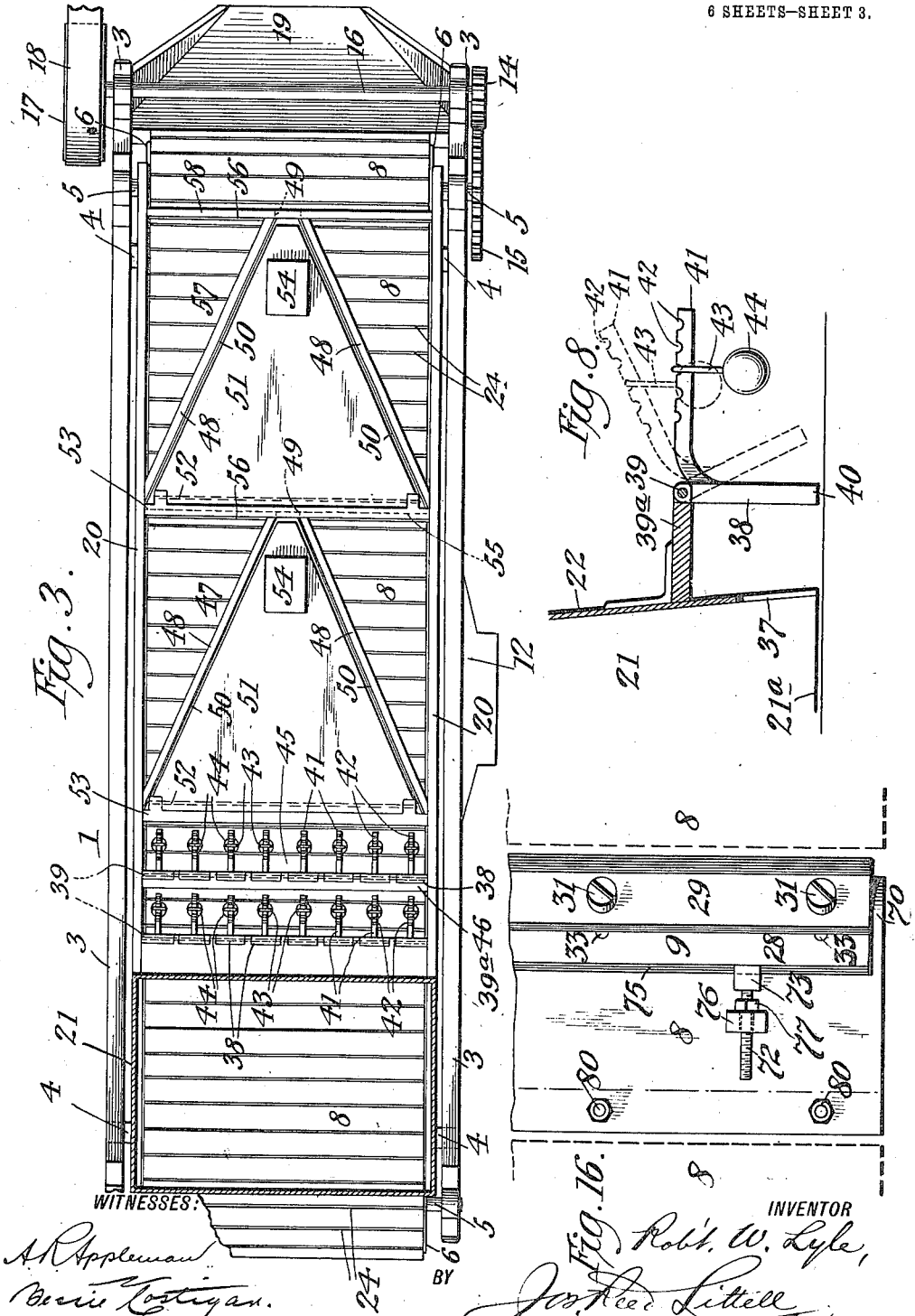

R. W. LYLE.
MEANS FOR SEPARATING STONES FROM CLAY.
APPLICATION FILED JULY 2, 1909. RENEWED FEB. 4, 1914.
1,092,780.
Patented Apr. 7, 1914.
6 SHEETS—SHEET 4.
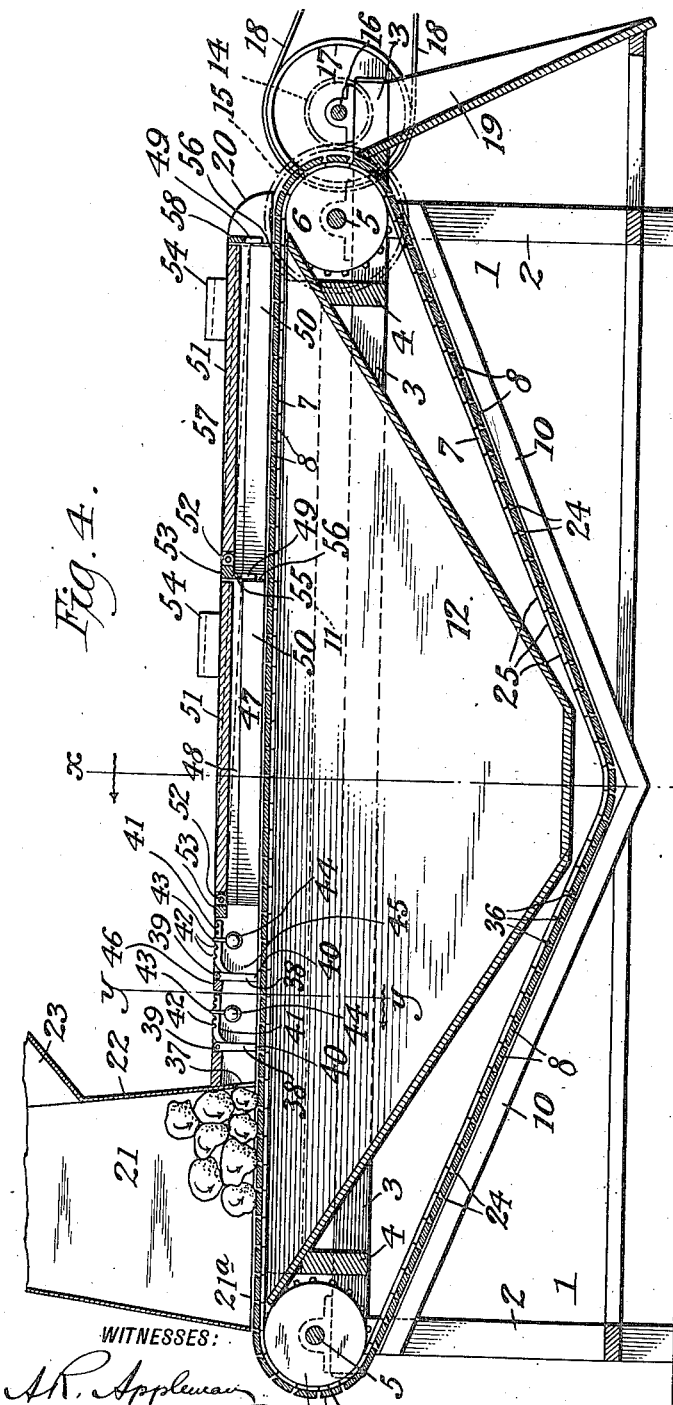
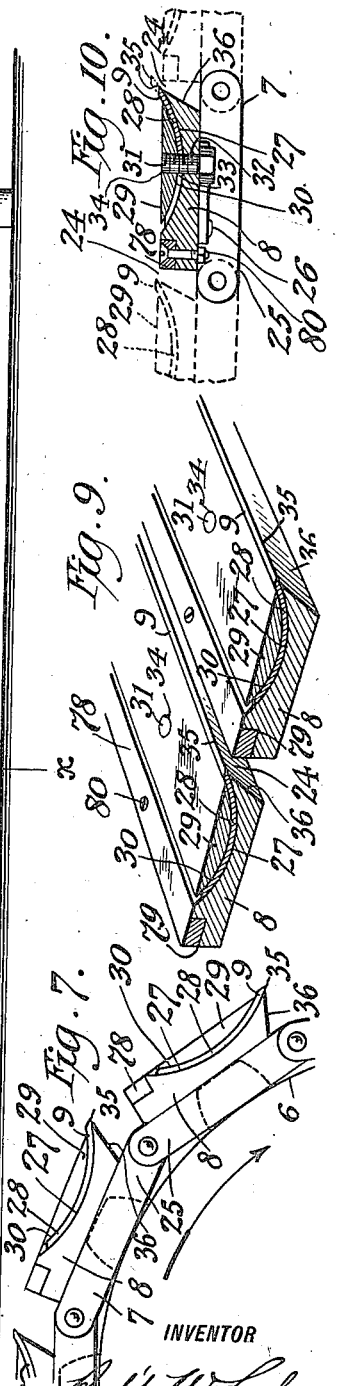
WITNESSES:
INVENTOR
Robt. W. Lyle,
BY Jos. Kerr Littell
his ATTORNEY.

R. W. LYLE.
MEANS FOR SEPARATING STONES FROM CLAY.
APPLICATION FILED JULY 2, 1909. RENEWED FEB. 4, 1914.
1,092,780.
Patented Apr. 7, 1914.
6 SHEETS—SHEET 5.
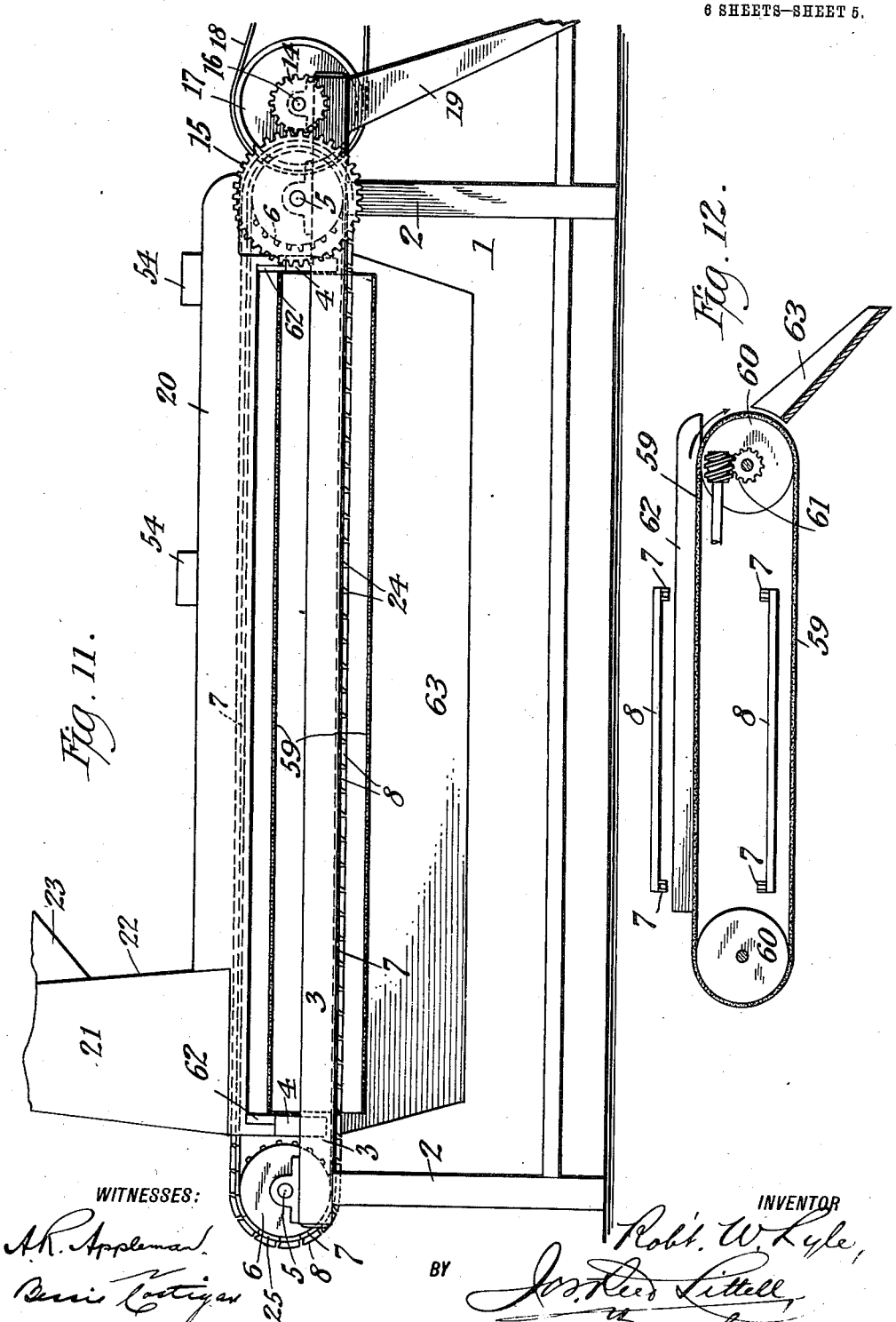

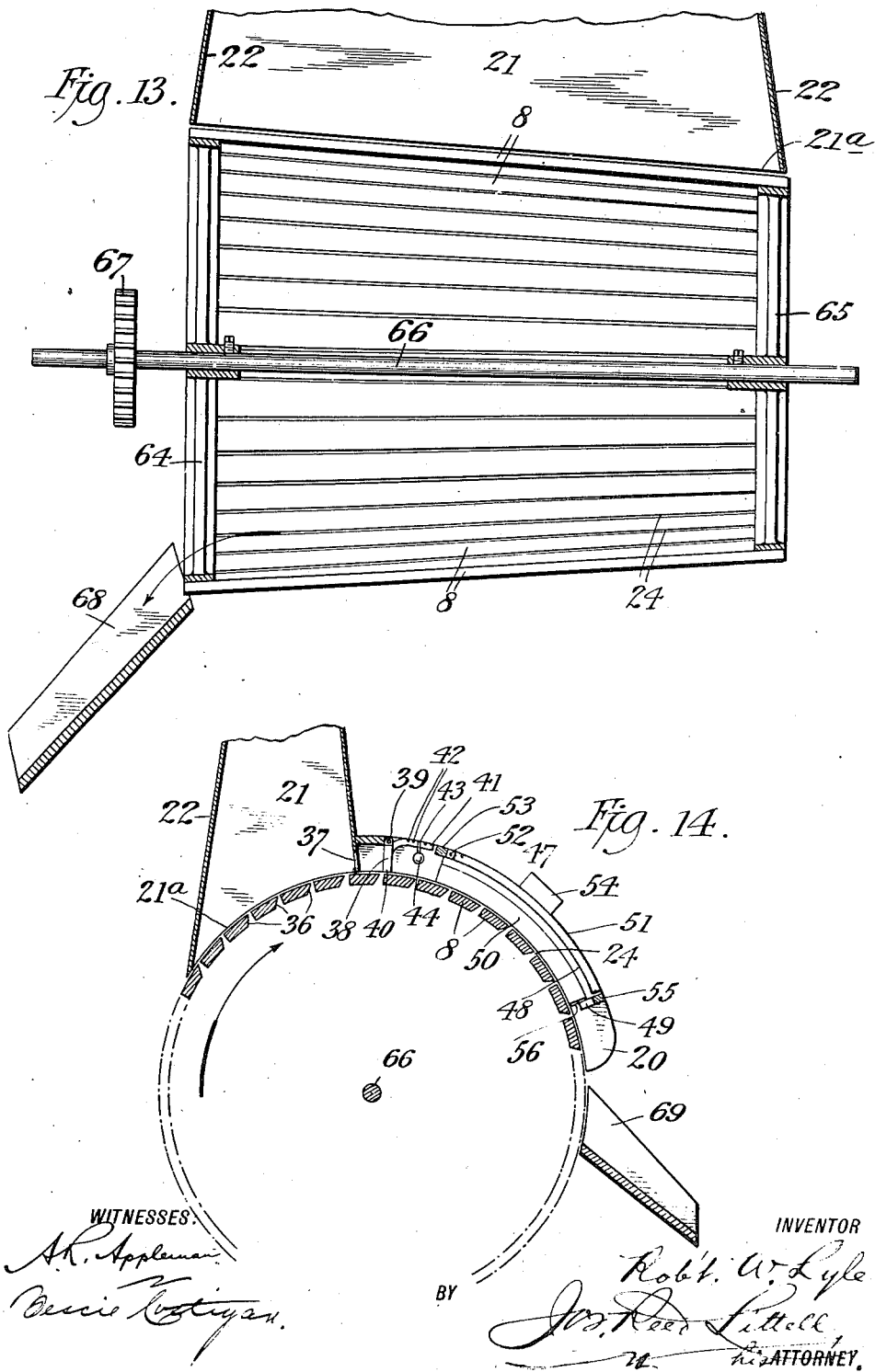
R. W. LYLE.
MEANS FOR SEPARATING STONES FROM CLAY.
APPLICATION FILED JULY 2, 1909. RENEWED FEB. 4, 1914.
1,092,780. Patented Apr. 7, 1914.
6 SHEETS—SHEET 6.

UNITED STATES PATENT OFFICE.

ROBERT W. LYLE, OF NEW YORK, N. Y., ASSIGNOR TO LYLE CLAY CLEANER COMPANY, A CORPORATION OF NEW JERSEY.

MEANS FOR SEPARATING STONES FROM CLAY.

1,092,780.      Specification of Letters Patent.      Patented Apr. 7, 1914.

Application filed July 2, 1909, Serial No. 505,704. Renewed February 4, 1914. Serial No. 816,613.

*To all whom it may concern:*

Be it known that I, ROBERT W. LYLE, a citizen of the United States, and resident of New York, in the county and State of New York, have invented certain new and useful Improvements in Means for Separating Stones from Clay, of which the following is a specification.

This invention relates to means for separating stone from clay, and it comprises an improved apparatus by which coarse clay direct from the clay bank is automatically separated and cleaned so that the clay is reduced to fine shavings and delivered in perfectly cleaned condition for use in the mixing machine, and the stones and other coarse elements are separately delivered at a desired point.

The object of my invention and improvements is to provide means of the character specified, which will be simple, rapid and economical and which will operate with the highest effectiveness and efficiency.

In the manufacture of clay products, the coarse clay as it comes from the clay bank is not adapted for proper service, as it contains stones which would render the manufactured product defective, and means have therefore been devised for overcoming this condition in the clay, the most effective prior means for this purpose being rolls yieldingly mounted, between which the crude clay is passed and by which the stones are broken into small particles. But, by this method of treating the clay, the stones are merely multiplied and distributed throughout the mass, and manufactured products made from clay thus treated are defective. In apparatus heretofore designed to separate the stones from the clay, the stones are liable to clog the apparatus and render any effective operation practically impossible or deficient.

My invention is designed to overcome all the conditions and disadvantages heretofore experienced and to enable the perfect separation and cleaning of the crude clay in such a manner that all the stones and undesirable elements are completely eliminated when the cleaned clay is ready for the mixing machine, thus insuring a manufactured product which will be free from any liability to such defects as holes, excrescences, pitting, blowing or flaking.

In the drawings—Figure 1 is a side elevation of an apparatus embodying my invention. Fig. 2 is an end elevation thereof. Fig. 3 is a top or plan view thereof. Fig. 4 is a vertical longitudinal sectional view, taken centrally through the apparatus. Fig. 5 is a vertical transverse sectional view, taken on the line *x—x*, Fig. 4. Fig. 6 is a vertical transverse sectional view, taken on the line *y—y*, Fig. 4. Fig. 7 is a detail sectional view illustrating the action of the knives in passing around the arc of the sprocket-wheels. Fig. 8 is a detail sectional view illustrating the operation of the trap-outlets. Fig. 9 is a detail perspective view illustrating the knife construction. Fig. 10 is a detail sectional view illustrating the self-sharpening adjustment of the knives. Fig. 11 is a vertical longitudinal sectional view of a modified construction of the apparatus, illustrating a modified arrangement of the means for delivering the shaved and cleaned clay from the apparatus. Fig. 12 is a vertical transverse sectional view of the modified construction shown in Fig. 11. Fig. 13 is a vertical longitudinal sectional view, illustrating another modified construction of the apparatus. Fig. 14 is a vertical transverse sectional view of the construction shown in Fig. 13. Fig. 15 is a detail sectional view, illustrating a modified construction for the adjustment of the knives. Fig. 16 is a detail plan view of the under side of the construction shown in Fig. 15.

Corresponding parts in all the figures are denoted by the same reference characters.

Referring to the drawings, 1 designates a suitable frame, which preferably comprises supporting standards, 2, carrying longitudinal side beams, 3, and end cross-beams, 4. An endless belt travels within the frame 1, over sprocket-wheels, and for this purpose shafts, 5, are journaled upon the side beams 3, adjacent each end of the apparatus, which shafts carry sprocket-wheels, 6, adjacent each end of the shaft and within the side beams 3. Said shafts and sprocket-wheels thus constitute a drum-like revolving structure at each end of the apparatus. Sprocket-chains, 7, pass around the sprocket-wheels 6 and are connected by cross-pieces, 8, carrying knives, 9, the construction of which will be hereinafter specifically described. The sprocket-chains and cross-pieces and knives thus constitute an endless belt which travels horizontally at the top of the apparatus and from end to end thereof, and forms the top operative surface of the apparatus, and which during its travel depends by gravity in approximately V-shape downwardly from and between the end sprocket mechanism and beneath the top portion of the apparatus. This loose downwardly-depending portion of the belt is supported upon and guided by inclined convergent tracks or guide strips, 10, comprised in the frame 1, upon which the cross-pieces or bars 8 slide or travel during the movement of the belt. The members 10 thus constitute a guide-frame which converges downwardly from each end of the apparatus. Between the end beams 4, at the top portion of the frame 1, are arranged a series of guide strips, 11, extending longitudinally and in parallel position beneath the horizontal top portion of the endless belt and operating to sustain said portion of the belt in horizontal operative position during its travel. The tracks or strips 11 thus constitute a top guide-frame for the belt, upon which the cross-pieces or bars 8 slide or travel. Mounted in the frame 1 is a delivery chute, 12, extending from beneath the horizontal top portion of the endless belt downwardly in inclined position to a suitable point at the side of the apparatus. The open top of this chute 12 is co-extensive with the length and width of the horizontal top portion of the endless belt, so that all the shaved and cleaned clay passing through said belt at all points in the operative status of the horizontal top portion of the belt will be deposited upon said chute and be delivered at the discharge end thereof. Said chute 12 occupies the space within the lower loose depending portion of the endless belt, as shown. To transmit motion to the belt, a gear, 14, meshes with a gear, 15, said latter gear being fixed upon one of the shafts 5 of the sprocket mechanism and said gear 14 being fixed upon a shaft, 16, journaled upon the side bar 3 of the frame 1 and carrying a band-wheel, 17, from which a power belt, 18, extends to any suitable source of power. With relation to the terminal end of the horizontal top portion of the endless belt, is arranged a chute, 19, having its open top at a point immediately beneath the lower terminal of the arc described by the belt in passing around and downwardly from the sprocket mechanism, said chute being carried by the frame 1 and inclined downwardly so that its discharge end is at a suitable point away from the end of the apparatus. The open top end of said chute 19 is co-extensive with the width of the endless belt, so that the stones and refuse matter from the clay, passing from the top surface of the belt, or the stones released from the belt when the knives 9 open up in describing the arc around the sprocket mechanism, will at all points of the transverse area of the belt be received by said chute 19 and be delivered by the same at its lower end. At the top of the frame 1 of the apparatus, is provided a guide-frame consisting of side strips, 20, extending above the horizontal top portion of the endless belt, at each side and longitudinally with relation thereto, to the terminal end where said horizontal top portion of the belt curves over and downwardly from the sprocket mechanism, the purpose of this guide-frame being to retain the stones or clay upon the operative surface of the belt continuously to the point of deposit upon the end chute 19.

A hopper, 21, is provided immediately above the initial end of the horizontal top portion of the endless belt, which hopper has an open top co-extensive with the transverse area and with a portion of the longitudinal area of said horizontal top portion of the belt. The lower edge of the open end of said hopper is close to the top surface of the belt, for instance, in practice, about one-eighth of an inch, and the horizontal top portion of the belt beneath the hopper 21 thus constitutes the bottom of said hopper. The hopper 21 diverges or expands toward its open bottom, 21ª, for which purpose the sides, 22, of the hopper are inclined convergently upward, as shown, whereby any clogging or "bridging" of the lumps of damp crude clay in its feed downwardly within the hopper is obviated. The feed of crude clay to the apparatus is through the hopper 21, and an inclined feed chute, 23, preferably extends to the hopper from a suitable point of clay supply.

In the construction of the endless belt constituted by the sprocket-chains 7 and the cross-bars 8 and knives 9, the belt is practically closed except for narrow transverse openings, as at 24, formed by a space existing between the cutting edge of each knife and the rear edge of the next adjoining cross-bar 8. Each link, 25, of the sprocket-chain 7, carries a cross-bar 8, the latter being suitably fastened at its ends to the links of the respective chains at each side of the belt, by bolting, as at 26, or otherwise. Each cross-bar 8 carries a cutting knife 9, extending transversely of the belt, the cutting edge of which constitutes the front edge of the cross-bar 8. Each cross-bar 8 is provided at the forward part of its outer face with a concave recess, 27, the bottom of which forms a segment, which recess extends on the longitudinal plane of the bar and transversely of the belt, and in this recess is set a plate of spring or resilient steel, 28, extending longitudinally in the recess and constituting the cutting knife. A clamping plate, 29, extending from end to end of said recess, bears upon the knife-plate 28 and binds the same in position, said clamping plate 29 having its outer face flush with the outer face of the bar 8 and its inner face, 30, curved in convex form, so that it constitutes a segment corresponding to the concave recess 27 and thus binds the knife-plate 28 in concave segmental contour and position. To provide for thus clamping the knife-plate or blade, a series of screw-bolts, 31, pass through threaded openings, 32, in the cross-bar 8, from the inner or under side thereof, and through openings, 33, in the knife-plate 28, and into threaded openings, 34, in the clamping plate 29. Thus, by adjustment of said screw-bolts 31, the knife-plate is firmly clamped in operative position with its forward edge, 35, projecting a short distance from the front edge of the cross-bar 8 and from between said bar and the clamping plate 29. The adjustment of the knife-plate 28 is such that its front edge 35 projects a short distance above the plane of the outer or top surface of the clamping plate 29 and the bar 8, and said edge 35 is at an angle to the transverse plane or diameter of the plate, as shown, thus constituting a sharp cutting edge. This cutting edge 35 thus projects above the outer or top plane of the cross-bar 8 immediately in front of it, and during the travel of the horizontal portion of the endless belt said cutting edge 35 is coincident with the vertical plane of the rear edge of said immediately adjacent cross-bar, the distance between said rear edge of the latter and said cutting edge 35 being preferably about one-eighth of an inch, which forms an open space transversely of the belt, through which the shavings of cleaned and separated clay can pass and drop through the belt as they are cut by the edge 35 during the travel in a horizontal plane of the operative top portion of the belt. To facilitate the passage of the clay, as just described, said open space is widened or enlarged beneath its mouth, by having the front edge, 36, of the cross-bars 8, beveled or inclined rearwardly, as shown. While said transverse opening at the cutting edge of the knives maintains uniformity the dimensions as just described, during the travel of the operative portion of the belt in a horizontal plane, it will be understood that when the terminal end of the horizontal portion of the belt describes the arc of travel over the sprocket mechanism, said space will open up and become wider, by reason of the relatively-angular position then assumed by the cross-bars 8, and permit any stones or matter which have lodged in said narrow space during the travel of the belt in a horizontal plane to drop out, as will be hereinafter further described. The knife-plates or blades 28 are adjustable forwardly, so that when the cutting edge 35 becomes dull a new cutting edge can be projected, instead of the tedious and expensive operation of manually sharpening the old edge. This is effected by having the openings 33 in the knife-plate 28 extended in the form of a slot toward the rear edge of the knife-plate, as shown, so that by release of the screw-bolts 31 the knife-plate may be adjusted forwardly between the cross-bar 8 and the clamping plate 29 and then again secured and clamped in this adjusted position. As this adjustment moves the knife-plate in the arc of a circle, the dulled cutting edge will, in the forward adjustment and change of position of the knife-plate, assume the same position as the cutting edge 35 originally had before it was dulled, and thus constitute a new cutting edge in perfect initial shape and position, whereby the knives are self-sharpening under the act of adjustment. The relative construction and arrangement, providing for the adjustment of the knives to maintain a normal cutting edge, as just described, is also advantageous for the reason that it enables the utilization of the metal of a substantial portion of the full width of the knife-plates before it becomes necessary to substitute new knife-plates. In practice, the width of the cross-bars 8 is preferably about four inches, and thus the cutting edges and transverse openings in the belt occur at intervals of about four inches, which produces the most rapid and effective result in the action of the belt for separating and cleaning the crude clay and for opening up the belt openings in describing the arc of movement around the sprocket mechanism in the action of releasing any stones or matter which may have lodged in the belt openings during the separating and cleaning operation.

The forward end of the feed hopper 21 is open transversely for a short distance at the bottom and immediately above the horizontal portion of the endless belt, as at 37, said opening being preferably about three inches in depth, and in front of said transverse opening is provided a series of pivoted traps, 38, which collectively close said opening 37. These trap-outlets 38 extend in series entirely across the opening 37 and are independently pivoted at their upper portion, as at 39, said pivots being preferably upon a bracket or brackets, 39ª, projecting from the front wall of the hopper 21 above the opening 37, and their lower edges, 40, depend closely with relation to the horizontal portion of the endless belt. Each of said trap-outlets 38 is weighted beneath its hinge or pivot, preferably by means of an arm, 41, projecting forwardly from the trap-outlet 38 and inclined upwardly and provided in its top edge with a series of recesses, 42, which receive a bail or hanger, 43, carrying a weight, 44, which is thus suspended and which can be adjusted by moving the hanger 43 with relation to the series of retaining recesses 42. The action of the series of weighted and suspended trap-outlets 38 is such that the pressure of the crude clay in the hopper 21 which may pass the small bottom opening 37 will not actuate said traps and be released thereby, but will be retained within the traps until the knife edges have fully operated upon the same. Any stones, however, passing through the opening 37 and bearing against the trap-outlets 38, or accumulating in rear thereof, will actuate said suspended traps by the bearing against the traps of such hard substances carried along by the travel of the belt and not soft enough to granulate against the resistance of the weighted traps, and the trap-outlets 38 will thus open against its weighted resistance sufficiently to permit the release of stones and their carriage forward by the belt to the point of deposit, and will automatically close when the resistance offered by the passage of the stones is released. The arrangement of the trap-outlets 38 in series, and individually mounted so that they independently operate, provides an effective operation with relation to the condition of the clay and stones passing the opening 37, for at one point there may be no resistance to actuate the trap-outlet and at another point such conditions may occur. Thus, during the operative action of this portion of the apparatus, the trap-outlets 38 independently move in a manner similar to the action of piano keys, the series of trap-outlets being in arrangement similar to a key-board. In practice, the trap-outlets 38 are preferably about four inches in width. From the foregoing description, it will be understood that the action of the trap-outlet construction with relation to the feed hopper construction and the travel of the horizontal portion of the endless belt, as just described, is such that the lumps of crude clay are retained within the hopper 21, and the smaller parts thereof which may pass the small bottom opening 37 are retained back of the trap-outlets 38, until the entire body of clay is thoroughly acted upon by the knives of the endless belt and shaved into particles which pass through the transverse openings 24 in the belt and are deposited upon the chute 12, while the stones and refuse matter of the clay pass through the opening 37 and are automatically released by action of the trap-outlets. In relation to the thorough subjection of the lumps of clay in the hopper 21 to the action of the cutting knives, it will be noted that the travel of the endless belt tends to direct the lumps of clay against the front wall of the hopper and thus causes their turning movement in an upward and rearward and downward direction, as indicated by the arrows in Fig. 3, whereby the lumps of clay are kept in active movement within the hopper and their various sides or surface portions are subjected to the action of the knives.

If desired, a supplementary set of trap-outlets 38 may be arranged, as herein shown, in front of the trap-outlet mechanism adjacent the hopper opening 37, whereby the trap-outlet action may be repeated upon the stones and any clay particles that may be passed by the first set of trap-outlets. This supplementary set of trap-outlets, as shown at 45, corresponds in all its structural characteristics to the initial set or series hereinabove described, and may be pivotally suspended from a cross-bar, 46, mounted upon and between the side strips 20 of the top frame of the apparatus, this cross-bar being at a suitable distance point in front of the first set or series of trap-outlets.

Within the top frame of the apparatus above the horizontal top portion of the endless belt, and immediately in front of the trap-outlet mechanism in front of the feed hopper 21, is arranged a baffle, 47, constituted by side strips, 48—48, extending from the side strips 20 of the top frame of the apparatus and converging forwardly, a small opening, as at 49, being provided at said front convergent end. This baffle operates to direct any particles of clay, which may be passed by the trap-outlet means, toward its front end 49 and to assemble and retain such clay particles within its convergent sides, whereby the clay particles will be continuously acted upon by the knives during their travel immediately beneath the baffle. The baffle thus serves, in a sense, as a secondary hopper for the material which is being acted upon. The lower edge of the side strips 48 of the baffle preferably has a yielding function, and for this purpose said lower edge may be formed of a continuous strip, as at 50, of flexible material, as for instance a rubber fabric, or of yielding or spring metal, said strip 50 being suitably secured to the side strips 48 and projecting beneath the same to close relationship with the top surface of the horizontal portion of the endless belt. Thus, the bottom edge of the baffle is adapted to permit the passage under the sides of the baffle of any stone or hard substances which being carried by the knives overcome the resistance of the yielding strip 50, but will not permit the passage of particles of clay which are soft enough to be acted upon by the knives without overcoming the resistance of the strip 50. The refuse matter from the baffle is also permitted to pass therefrom at the small front opening 49 at the convergent end thereof. In the construction as hereinabove described, the material to be treated is acted upon continuously, by the cutting edges of the endless belt, not only within the feed hopper 21 but at all points of the horizontal top portion of the belt beneath the trap-outlet means and beneath the baffle means. The baffle is preferably provided with a top constituting a drag, which top-drag consists of a plate or board, 51, conforming to the V-shaped contour of the baffle and pivoted or hinged, at its rear edge, as at 52, to a cross-strip, 53, mounted between the side strips 20 of the top frame of the apparatus. The drag 51 is thus adapted to work upon its hinged or pivoted rear edge so that its body portion will move downwardly and upwardly within the baffle between the side strips 48 and bear upon the material contained within the baffle, thus exerting pressure to force and retain said material against the cutting edges of the endless belt. The drag 51 may be weighted, as at 54, by a suitable weight mounted upon its forward portion, to augment its operative action. Intersecting the front portion of the baffle, preferably on the plane of the front opening 49 thereof, but not closing said opening, is arranged a cross-strip, 55, extending transversely between the side strips 20 of the top frame of the apparatus and constituting a retarding wall for the stones or particles which may be passed by the bottom edge strips 50 of the side walls 48 of the baffle and be carried upon the portions of the endless belt which are outside the area of the baffle. The retarding wall 55 thus operates to retain the material for the action of the cutting edges of the belt at each side the area of the baffle, and it is provided at its lower edge with a yielding strip, 56, corresponding to the strips 50, to permit the passage of stones and hard particles and retard the passage of the material which can be reduced by the knives.

If desired, a supplementary baffle, as herein shown at 57, may be arranged immediately in front of the cross-strip 55 constituting the retarding wall, as just described, which supplementary baffle corresponds in construction to the baffle immediately in front of the trap-outlet means, so that the material passed by the first baffle 47 and by the retarding wall 55 will again be subjected to the baffle action; and at the front portion of the supplementary baffle 57 may be arranged a supplementary retarding wall, as herein shown at 58, corresponding in construction to the cross-strip 55 at the rear of the supplementary baffle 57 and operating to retard the passage of the material passed by the sides of the supplementary baffle 57. The baffle means and the transverse retarding wall means and the trap-outlet means may be multiplied as desired, and duplicated in their successive arrangement, over the surface-area of the horizontal top portion of the endless belt, so that the material being treated can be successively acted upon by the various means a number of times before it reaches the discharge end of the horizontal portion of the belt, for instance, a trap-outlet means corresponding in construction to that hereinabove described may be provided as the final retarding means immediately above the front end of the horizontal portion of the endless belt where the latter passes over and around the sprocket mechanism. From the foregoing description, it will be understood that the material is acted upon successively and a plurality of times throughout the whole area of the horizontal top portion of the endless belt.

In Figs. 11 and 12, I have illustrated a modified construction of the apparatus, in which the delivery chute 12 for the shaved and cleaned clay is dispensed with, and the depending loose bottom portion of the endless belt passes in horizontal position directly from and between the end sprocket mechanism, and the lower guide-frame 10 is omitted. In lieu of the parts just mentioned, this modified construction embodies an endless delivery belt, as at 59, for receiving and conveying and depositing the shaved and cleaned clay which drops through and from the horizontal top portion of the endless belt. This delivery belt 59 may be of any suitable or adapted fabric or material and operates at right angles to the knife belt, so that its horizontal top portion travels within the knife belt and beneath the horizontal top portion of the knife belt and corresponds in width to the longitudinal extent of said horizontal top portion of the knife belt, while its bottom horizontal portion travels beneath the bottom horizontal portion of the knife belt. Said transverse delivery belt 59 is mounted upon and carried by suitable end drums, 60, and connected by suitable gear mechanism, as at 61, with the driving gear of the apparatus. In this modified construction, transverse strips, as at 62, may be arranged within the top frame of the apparatus, at each of the side edges of the horizontal top portion of the delivery belt 59 and beneath the horizontal top portion of the knife belt. Said strips 62 extend across the width of the horizontal top portion of the knife belt and project above the horizontal top portion of the delivery belt 59 and thus constitute guides for retaining the shaved and cleaned clay upon the delivery belt until it reaches the point of delivery therefrom. At the delivery end of the belt 59 may be arranged a suitable chute, as at 33, for receiving the product delivered therefrom and conveying the same to the desired point of deposit.

In Figs. 13 and 14, I have illustrated a further modified construction, in which the cross-bars 8 and knives 9 are not arranged in the form of a sprocket-driven belt but are mounted upon annular spiders or end frames, 64 and 65, the cross-bars 8 being bolted or otherwise secured to the peripheries of said end frames. The end frame 65 is of less diameter than the end frame 64, whereby said frames and the cross-bars and knives constitute a conical drum the outer surface of which is formed by the cross-bars and knives and the larger end of which, 64, is open. This drum is mounted upon a longitudinal shaft, 66, by which the spider or end frames 64 and 65 are carried, and said shaft carries a gear mechanism, as at 67, by which power may be transmitted for the revolution of the conical drum. In this construction, the shaved and cleaned clay drops through the openings between the knife edges 35 and cross-bars 8 into the interior of the drum, and by reason of the conical contour thereof feeds down the interior incline of the drum to the lower portion of the larger open end 64 thereof, from whence it passes to a suitable delivery chute, as at 68. In this modified construction of the cutting mechanism of the apparatus, the feed hopper 21 corresponds in its general features of construction to the feed hopper as employed in the sprocket belt construction herein described, and said hopper overlies the longitudinal extent of the revolving drum and its bottom portion incloses a segment of said drum at the top thereof. At the front of said hopper is arranged a set or series of trap-outlets, corresponding in construction to the trap-outlet arrangement hereinbefore described and operating with respect to the peripheral surface of the drum, and, if desired, the same general arrangement of baffle means and resistance-wall means and guide-frame may be employed with relation to a portion of the peripheral surface of the drum in front of said trap-outlet means. Thus, the stones and refuse matter will be deposited from the surface of the drum to a suitable chute, as at 69, while the shaved and cleaned clay will be deposited from the interior of the drum. This modified construction is effectively adapted for use in treating clay of comparatively fine quality in which a small percentage of small stones exists.

In Figs. 15 and 16, I have illustrated a modified construction of the cross-bars 8 and a modified adjustable arrangement of the knife-plates 28 with relation to said cross-bars. In this construction, the outer face of the cross-bar 8 is flat, and the underside of its front or forward edge is curved or beveled in segmental contour, as at 70, to conform to the concave segmental contour of the knife-plate 28, which in this construction bears against said under side of the front edge of the cross-bar. Thus, in this modified construction, the recess 27 in the outer face of the cross-bar 8, as in the construction hereinbefore described, is eliminated, and the knife-plate 28, instead of being received by and clamped in such recess 27, is simply clamped against the correspondingly curved convex front edge 70 of the cross-bar 8. The clamping plate 29, in lieu of having its inner face curved in convex form, as hereinbefore described, has its inner face curved in concave form, as at 71, so that it corresponds to the outer curvature of the knife-plate 28 and to the convex curvature of the front edge 70 of the cross-bar 8 and bears against the outer face of the knife-plate 28, at the under side of the cross-bar 8, to clamp the knife-plate against the curved edge 70 of the cross-bar, the clamping screw-bolts 31 being passed through openings in the clamping plate 29, through the slotted opening 33 in the knife-plate 28 and into the threaded opening 32 in the cross-bar 8. In the construction just described, the position and contour of the knife-plate 28, with relation to the front edge of the cross-bar 8, is the same as in the construction previously described, except that in the present construction the knife-plate itself constitutes the front edge of the cross-bar 8, and in the resistance of the knife in its cutting function it bears directly against the front edge of the cross-bar. This modified construction thus presents a simplified arrangement, comparatively inexpensive in construction and effective in operation, providing a continuous flat outer surface for the cross-bar 8 and causing any strain upon the knife to more firmly bind it in operative position against the cross-bar. This construction also enables a convenient and accurate adjustment of the knife-plate 28, by adjustment devices carried at the under side of the cross-bar 8 and bearing against the rear edge of the knife-plate 28. These adjustment devices preferably consist of screw-bolts, 72, carrying at their forward end heads, 73, having beveled recesses, 74, receiving the correspondingly beveled rear edge, as at 75, of the knife-plate 28, said screw-bolts 72 being guided in lugs or projections, 76, upon the under side of the cross-bar 8, and carrying set-nuts, 77, bearing against said projections 76, whereby said screw-bolts may be adjusted forwardly to move the knife-plates in a corresponding adjustment.

It will be noted that the cross-bars 8 are preferably provided at their outer rear edge, immediately in front of the cutting edge 35 of the adjacent knife-plate 28, with wearing strips, 78, extending transversely of the cross-bar and secured in a corresponding recess, 79, in the cross-bar, preferably by means of screw-bolts, as at 80, passing through said wearing strips and through the cross-bar. The relative construction and arrangement is such that these wearing strips may be turned in their positional connection with the cross-bar, to present their different edges at the outer rear edge of the cross-bar, and thus compensate at that point for any wear by action of the shaved clay passing between said edge and the cutting edge of the adjacent knife-plate.

The links of the chain 7 preferably run upon bearing strips, as at 81 (see Fig. 6), constituting the top surface of the side tracks or guide strips 11, which bearing strips 81 may be of fiber or other suitable material and adapted to be lubricated. If desired, the top operative horizontal portion of the endless belt can run entirely upon the chain links bearing on the track surface 81 at the side strips 11, and the intermediate guide strips 11 can be eliminated, thus entirely supporting the belt upon the chain links and avoiding wear or friction upon the cross-bars 8 by the guide strips 11.

The operation and advantages of my invention and improvements will be readily understood by those skilled in the art to which they appertain.

In principle, the crude clay is subjected to the action of a traveling cutting surface whereby it is shaved in comparatively small particles and such shavings constituting clean clay pass through such cutting surface to a point of delivery, while the stones and refuse matter are carried by the cutting surface to a separate point of deposit.

In principle, the invention further involves the retarding of the crude clay and stones, during the action of the cutting surface, so that the material is successively subjected to the action of the cutting surface and successively retained with relation to the cutting surface for subjection to such action.

The invention further comprises the principle of opening up the cutting surface for the release of such stones and hard refuse matter as may have lodged in the discharge openings of the cutting surface during the action of the latter upon the material. The operation is thus continuous and successive, affording a large capacity and rapidity of operation and thorough effectiveness in the complete separation and cleaning of the clay.

The improved apparatus herein described will, by reason of its construction and arrangement, separate both large and small pieces of stone and hard refuse matter, and particularly will not be clogged by small stones or pieces, but will also effectively discharge the latter, particularly by action of the cutting surface in its movement in the arc of a circle as hereinabove described. The self-sharpening feature of the cutting edges is also an important advantage and economy derived from my invention and improvements. The resulting product of the apparatus is a pure clay delivered in fine shavings, and in perfect cleaned condition, for the action of the mixing machine, which product is more readily susceptible to the action of water in the mixing machine than if it were delivered in large particles or lumps, and this product enables the manufacture of all types of clay product, whether vitrified or not, with economy, and in more perfect condition and without the defects usually heretofore experienced when small or granulated stones and hard particles of refuse matter exist in the clay after the attempt to separate and clean it and when it reaches the mixing machine.

I do not desire to be understood as limiting myself to the detail construction and arrangement of parts as herein shown and described, as it is manifset that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. In apparatus for separating stones from clay, a moving cutter surface operating to cut the clay and thereby separate the clay from the stones and refuse matter and having openings for the passage of the cut clay, and means for maintaining a continuous successive action of said cutter surface upon the crude clay and for simultaneously permitting the carriage of the stones and refuse matter upon the cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

2. In apparatus for separating stones from clay, a moving cutter surface having openings for the passage of the cut clay, means for holding and retaining the crude clay in contact with said cutter surface, and means for maintaining the carriage of the stones and refuse matter upon said moving cutter surface beyond the operative cutting portion of said surface and to a point of deposit therefrom.

3. In apparatus for separating stones from clay, a moving cutter surface having openings for the passage of the cut clay, means for holding and retaining the crude clay in contact with said cutter surface, means for the carriage of the cut clay which passes through said cutter surface to a point of deposit. and means for maintaining the carriage of the stones and refuse matter by and upon said cutter surface beyond the operative cutting portion of said surface and to a point of deposit therefrom.

4. In apparatus for separating stones from clay, a moving cutter surface constituting a traveling carrier for the stones and refuse matter and having openings for the passage of the cut clay, means for holding and retaining the crude clay in contact with said cutter surface, and trap means operating in the direction of the line of travel of said moving cutter and carrier surface for retarding the carriage of the clay upon said moving cutter surface and for permitting the passage thereon of the stones and refuse matter.

5. In apparatus for separating stones from clay, a moving cutter surface having openings for the passage of the cut clay, means for holding and retaining the crude clay in contact with said cutter surface, trap means for retarding the carriage of the clay upon said moving cutter surface and for permitting the passage thereon of the stones and refuse matter, and means for maintaining the carriage of the stones and refuse matter by and upon said cutter surface to a point of deposit therefrom.

6. In apparatus for separating stones from clay, a moving cutter surface constituting a traveling carrier for the stones and refuse matter and having openings for the passage of the cut clay, means for holding and retaining the crude clay in contact with said cutter surface, trap means for retarding the carriage of the clay upon said moving cutter surface and for permitting the passage thereon of the stones and refuse matter, means beneath said moving carrier and cutter surface for collecting and depositing the cut clay which passes therethrough, and means for maintaining the carriage of the stones and refuse matter by and upon said cutter surface to a point of deposit therefrom.

7. In apparatus for separating stones from clay, a moving cutter surface constituting a traveling carrier for the stones and refuse matter and having openings for the passage of the cut clay, and trap means operating in the direction of the line of travel of said moving cutter and carrier surface for retarding the carriage of the clay upon said moving cutter surface and for permitting the passage thereon of the stones and refuse matter.

8. In apparatus for separating stones from clay, a moving cutter surface having openings for the passage of the cut clay, and trap means for retarding the carriage of the clay upon said moving cutter surface and for permitting the passage thereon of the stones and refuse matter, said trap means being arranged in series to form a closed wall at an angle to the line of travel of said moving cutter surface and constituted by independently-operating members or elements.

9. In apparatus for separating stones from clay, a moving cutter surface constituting a traveling carrier for the stones and refuse matter and having openings for the passage of the cut clay, and gravity trap means operating in the direction of the line of travel of said moving cutter and carrier surface for retarding the carriage of the clay upon said moving cutter surface and for permitting the passage thereon of the stones and refuse matter.

10. In apparatus for separating stones from clay, a moving cutter surface having openings for the passage of the cut clay, and a closed wall constituted by a series of independently-mounted swinging traps for retarding the carriage of the clay upon said moving cutter surface and for permitting the passage thereon of the stones and refuse matter.

11. In apparatus for separating stones from clay, a moving cutter surface having openings for the passage of the cut clay, and a closed wall constituted by weighted gravity trap means for retarding the carriage of the clay upon said moving cutter surface and for permitting the passage thereon of the stones and refuse matter.

12. In apparatus for separating stones from clay, a moving cutter surface having openings for the passage of the cut clay, and a key-board of independently-mounted swinging traps collectively constituting a closed wall and assembled in a plane at an angle to the direction of movement of said cutter surface and independently operating to retard the carriage of the clay upon said moving cutter surface and to permit the passage thereon of the stones and refuse matter.

13. In apparatus for separating stones from clay, a moving cutter surface constituting a traveling carrier for the stones and refuse matter and having openings for the passage of the cut clay, and trap means opening and closing with relation to said moving cutter and carrier surface.

14. In apparatus for separating stones from clay, a moving cutter surface traveling continuously in one direction and constituting a carrier for the stones and refuse matter and having openings for the passage of the cut clay, and a wall at an angle to the direction of movement of said cutter surface, said wall being constituted by trap means opening and closing with relation to said moving cutter and carrier surface to retard the carriage of the clay upon said moving cutter surface and to permit the passage thereon of the stones and refuse matter.

15. In apparatus for separating stones from clay, a moving cutter surface traveling continuously in one direction and constituting a carrier for the stones and refuse matter and having openings for the passage of the cut clay, and a wall extending transversely of the direction of movement of said cutter surface and constituted by a continuous series of independent trap means opening and closing with relation to said moving carrier and cutter surface to retard the carriage of the clay upon said moving cutter surface and to permit the passage thereon of the stones and refuse matter.

16. In apparatus for separating stones from clay, a moving cutter surface operating to cut the clay and thereby separate the clay from the stones and refuse matter and constituting a carrier for the stones and refuse matter and having openings for the passage of the cut clay, a hopper mounted above said cutter and carrier surface and having its bottom constituted thereby, and means for permitting the egress of the stones and refuse matter from the hopper during their carriage upon said cutter and carrier surface as they are separated from the crude clay and while the material under action in the hopper is retarded and subject to the action of the cutter surface.

17. In apparatus for separating stones from clay, a feed hopper having a moving bottom carrying cutting means and operating to cut the clay and thereby separate the clay from the stones and refuse matter and constituting a carrier for the stones and refuse matter, and means for permitting the egress of the stones and refuse matter from the hopper during their carriage upon said cutter and carrier surface as they are separated from the crude clay and while the material under action in the hopper is retarded and subject to the action of the cutter surface.

18. In apparatus for separating stones from clay, a feed hopper having a moving bottom carrying cutting means and operating to cut the clay and thereby separate the clay from the stones and refuse matter and constituting a carrier for the stones and refuse matter and having openings for the passage of the cut clay, and means for permitting the egress of the stones and refuse matter from the hopper during their carriage upon said cutter and carrier surface as they are separated from the crude clay and while the material under action in the hopper is retarded and subject to the action of the cutter surface.

19. In apparatus for separating stones from clay, a moving cutter surface operating to cut the clay and thereby separate the clay from the stones and refuse matter and having openings for the passage of the cut clay, a stationary hopper mounted above said cutter surface and having its bottom constituted thereby, said hopper having its interior area enlarged downwardly toward said moving cutter surface and in the direction of the line of travel thereof, whereby the combined action of said moving cutter surface and said enlarged hopper area produces variable positions of the lumps of clay as they are carried by said moving cutter surface and retained within the hopper subject to the action of said surface, and means for automatically permitting the release and carriage of the stones and refuse matter beyond said hopper and to a point of deposit.

20. In apparatus for separating stones from clay, a moving cutter surface operating to cut the clay and thereby separate the clay from the stones and refuse matter and having openings for the passage of the cut clay, and a stationary hopper mounted above said cutter surface and having its bottom constituted thereby, said hopper having its front wall inclined downwardly and forwardly toward said moving cutter surface and in the direction of the line of travel thereof, whereby the combined action of said moving cutter surface and said inclined wall produces variable positions of the lumps of clay as they are carried by said moving cutter surface and retained within the hopper subject to the action of said surface.

21. In apparatus for separating stones from clay, a moving cutter surface traveling continuously in one direction and having openings for the passage of the cut clay, and means for retaining the crude clay in contact with said cutter surface, said means comprising a wall projecting with relation to said moving surface and inclined downwardly and forwardly in the direction of the line of travel thereof, whereby the lumps of clay will be turned under the combined action of said retaining wall and the moving cutter surface.

22. In apparatus for separating stones from clay, a hopper, a moving cutter surface having a platform portion constituting the bottom of said hopper and operating to cut the clay and thereby separate the clay from the stones and refuse matter and having openings for the passage of the cut clay, said cutter surface traveling continuously in one direction beneath said hopper toward the front thereof, means at the front of the hopper for retarding and deflecting the forward movement of the lumps of clay as they travel under the action of said moving cutter surface, and means for permitting the release of the stones and refuse matter from said hopper as they are separated from said retarded and deflected lumps of clay in a simultaneous and continuous movement while the retarded and deflected lumps of crude clay are subject to the action of the cutter surface, whereby the lumps of clay will be turned under the combined action of said retarding means and the moving surface until the stones and refuse matter are separated therefrom and released from the hopper in a continuous successive action.

23. In apparatus for separating stones from clay, a moving cutter surface traveling continuously in one direction and constituting a carrier for the stones and refuse matter and having openings for the passage of the cut clay, a hopper mounted above said cutter surface and having an outlet opening at its lower forward end in the direction of the line of travel of said moving cutter and carrier surface, and trap means operating in the direction of the line of travel of said moving surface for opening and closing said hopper opening to retard the carriage of the clay upon said moving cutter surface and to permit the passage thereon of the stones and refuse matter.

24. In apparatus for separating stones from clay, a moving cutter surface traveling continuously in one direction and constituting a carrier for the stones and refuse matter and having openings for the passage of the cut clay, a hopper mounted above said cutter surface and having an outlet opening at its lower forward end in the direction of the line of travel of said moving cutter and carrier surface, and an automatic control for opening and closing said hopper opening.

25. In apparatus for separating stones from clay, a moving cutter surface traveling continuously in one direction and constituting a carrier for the stones and refuse matter, said cutter surface operating to cut the clay and thereby separate the clay from the stones and refuse matter and having openings for the passage of the cut clay, a hopper mounted above said cutter and carrier surface and having its bottom constituted by the operative cutting portion thereof, said hopper being provided with an outlet opening for the stones and refuse matter in the direction of the line of travel of said moving surface and immediately above said surface, and means for maintaining a continuous successive action of said cutter surface upon the crude clay and for simultaneously permitting the carriage of the stones and refuse matter upon the cutter surface and through said opening in a continuous movement as they are separated from the crude clay in a simultaneous and continuous action during the movement of said surface and while the crude clay is subject to the action of the operative cutting portion thereof.

26. In apparatus for separating stones from clay, a moving cutter surface traveling continuously in one direction and constituting a carrier for the stones and refuse matter, said cutter surface operating to cut the clay and thereby separate the clay from the stones and refuse matter and having openings for the passage of the cut clay, a hopper mounted above said cutter and carrier surface and having its bottom constituted by the operative cutting portion thereof, said hopper being provided with an outlet opening for the stones and refuse matter in the direction of the line of travel of said moving surface and immediately above said surface, and retarding means mounted with relation to said hopper opening to retard the carriage of the clay upon said moving cutter surface and to simultaneously permit the carriage of the stones and refuse matter upon the cutter surface and through said opening in a continuous movement as they are separated from the crude clay in a simultaneous and continuous action during the movement of said surface and while the crude clay is subject to the action of the operative cutting portion thereof.

27. In apparatus for separating stones from clay, a hopper having an outlet opening at its lower forward end and comprising means operating to separate the clay from the stones and refuse matter while in the hopper, said means comprising a moving surface traveling continuously in a direction toward said outlet opening and operating as a carrier for the stones and refuse matter as they are separated from the crude clay and while the latter is subject to the action of said separating means, and a closure for said outlet opening consisting of a closed wall constituted by a series of independently-mounted swinging traps to retard the passage of the clay from the hopper and independently operating to permit the passage of the stones and refuse matter at individual points along said wall.

28. In apparatus for separating stones from clay, a hopper having an outlet opening at its lower forward end and comprising means operating to separate the clay from the stones and refuse matter while in the hopper, said means comprising a moving surface traveling continuously in a direction toward said outlet opening and operating as a carrier for the stones and refuse matter as they are separated from the crude clay and while the latter is subject to the action of said separating means, and an automatic closure for said outlet opening to retard the passage of the clay from the hopper and to permit the passage of the stones and refuse matter during the retarding action upon the clay.

29. In apparatus for separating stones from clay, a hopper having an outlet opening at its lower forward end and comprising means operating to separate the clay from the stones and refuse matter while in the hopper, said means comprising a moving surface traveling continuously in a direction toward said outlet opening and operating as a carrier for the stones and refuse matter as they are separated from the crude clay and while the latter is subject to the action of said separating means, and a gravity trap means constituting a closure for said outlet opening to retard the passage of the clay from the hopper and to permit the passage of the stones and refuse matter during the retarding action upon the clay.

30. In apparatus for separating stones from clay, a hopper having an outlet opening at its lower forward end, and comprising means operating to separate the clay from the stones and refuse matter while in the hopper, said means comprising a moving surface traveling continuously in a direction toward said outlet opening and operating as a carrier for the stones and refuse matter as they are separated from the crude clay and while the latter is subject to the action of said separating means, and a key-board constituting a closed wall for said outlet opening and consisting of independently-operating trap keys to retard the passage of the clay from the hopper and independently operating to permit the passage of the stones and refuse matter at individual points along said wall.

31. In apparatus for separating stones from clay, a moving cutter surface operating to cut the clay and thereby separate the clay from the stones and refuse matter and constituting a carrier for the stones and refuse matter as they are separated from the crude clay and while the unseparated material is subject to the action of the cutter surface, said cutter and carrier surface having openings for the passage of the cut clay, and a key-board mounted above said moving cutter and carrier surface and consisting of independently-operating trap keys to retard the passage of the clay upon said moving cutter surface and to permit the passage thereon of the stones and refuse matter during the retarding action upon the clay.

32. In apparatus for separating stones from clay, a moving cutter surface having openings for the passage of the cut clay, and a plurality of successively-arranged retarding means mounted with relation to the operative part of the moving cutter surface in the direction of movement thereof to successively retard the clay upon said moving cutter surface and to permit the passage thereon of the stones and refuse matter.

33. In apparatus for separating stones from clay, a moving cutter surface having openings for the passage of the cut clay, and a baffle mounted above said moving cutter surface and comprising means for retarding the clay upon said moving cutter surface and for permitting the passage thereon of the stones and refuse matter.

34. In apparatus for separating stones from clay, a moving cutter surface having openings for the passage of the cut clay, a baffle mounted above said moving cutter surface and comprising means for retarding the clay upon said moving cutter surface and for permitting the passage thereon of the stones and refuse matter, and a drag for bearing upon the material within said baffle.

35. In apparatus for separating stones from clay, a moving cutter surface having openings for the passage of the cut clay, a baffle mounted above said moving cutter surface and comprising means for retarding the clay upon said moving cutter surface and for permitting the passage thereon of the stones and refuse matter, and a pivotally-mounted drag for bearing upon the material within said baffle.

36. In apparatus for separating stones from clay, a moving cutter surface having openings for the passage of the cut clay, a baffle mounted above said moving cutter surface and comprising means for retarding the clay upon said moving cutter surface and for permitting the passage thereon of the stones and refuse matter, and a weighted drag for bearing upon the material within said baffle.

37. In apparatus for separating stones from clay, a moving cutter surface having openings for the passage of the cut clay, a baffle mounted above said moving cutter surface and comprising means for retarding the clay upon said moving cutter surface and for permitting the passage thereon of the stones and refuse matter, and a pivotally-mounted weighted drag for bearing upon the material within said baffle.

38. In apparatus for separating stones from clay, a moving cutter surface having openings for the passage of the cut clay, a baffle mounted above said moving cutter surface and comprising means for retarding the clay upon said moving cutter surface and for permitting the passage thereon of the stones and refuse matter, and means for bearing upon the material within said baffle.

39. In apparatus for separating stones from clay, a moving cutter surface having openings for the passage of the cut clay, a baffle mounted above said moving cutter surface and comprising means for retarding the clay upon said moving cutter surface and for permitting the passage thereon of the stones and refuse matter, and a closure for said baffle.

40. In apparatus for separating stones from clay, a moving cutter surface having openings for the passage of the cut clay, a baffle mounted above said moving cutter surface and comprising means for retarding the clay upon said moving cutter surface and for permitting the passage thereon of the stones and refuse matter, and a closure for said baffle operative upwardly and downwardly within the baffle.

41. In apparatus for separating stones from clay, a moving cutter surface having openings for the passage of the cut clay, and a baffle mounted above said moving cutter surface and having yielding bottom edges to retard the clay upon said moving cutter surface and to permit the passage thereon of the stones and refuse matter.

42. In apparatus for separating stones from clay, a moving cutter surface having openings for the passage of the cut clay, a baffle mounted above said moving cutter surface, and trap means at the bottom of the baffle to retard the clay upon said moving cutter surface and to permit the passage thereon of the stones and refuse matter.

43. In apparatus for separating stones from clay, a moving cutter surface having openings for the passage of the cut clay, and a baffle mounted above said moving cutter surface and provided with a trap outlet to retard the clay upon said moving cutter surface and to permit the passage thereon of the stones and refuse matter.

44. In apparatus for separating stones from clay, a moving cutter surface having openings for the passage of the cut clay, and a baffle mounted above said moving cutter surface and having opening and closing side portions to retard the clay upon said moving cutter surface and to permit the passage thereon of the stones and refuse matter.

45. In apparatus for separating stones from clay, a moving cutter surface having openings for the passage of the cut clay, and a baffle mounted above said moving cutter surface and having its rear wall constituted by trap means for retarding the clay upon said moving cutter surface and for permitting the passage thereon of the stones and refuse matter.

46. In apparatus for separating stones from clay, a moving cutter surface having openings for the passage of the cut clay, and a baffle mounted above said moving cutter surface and having its rear wall constituted by a series of independently-operating trap means for retarding the clay upon said moving cutter surface and to permit the passage thereon of the stones and refuse matter.

47. In apparatus for separating stones from clay, a moving cutter surface having openings for the passage of the cut clay, a baffle mounted above said moving cutter surface, and a transverse retarding wall arranged with relation to the front portion of the baffle and extending across the plane of movement of the portion of said cutter surface at the sides of the baffle.

48. In apparatus for separating stones from clay, a moving cutter surface having openings for the passage of the cut clay, a baffle mounted above said moving cutter surface, a transverse retarding wall arranged with relation to the front portion of the baffle and extending across the plane of movement of the portion of said cutter surface at the sides of the baffle, and trap means at the bottom of said retarding wall for retarding the clay upon said moving cutter surface and for permitting the passage thereon of the stones and refuse matter.

49. In apparatus for separating stones from clay, a moving cutter surface having openings for the passage of the cut clay, a baffle mounted above said moving cutter surface and having convergent side walls, trap means comprised in said side walls of the baffle for retarding the clay upon said moving cutter surface and for permitting the passage thereon of the stones and refuse matter, a transverse retarding wall arranged with relation to the front portion of the baffle and extending across the plane of movement of the portion of said cutter surface at the sides of the baffle, and trap means comprised in said transverse retarding wall for retarding the carriage of the clay upon said moving cutter surface and for permitting the passage thereon of the stones and refuse matter.

50. In apparatus for separating stones from clay, a moving cutter surface having openings for the passage of the cut clay, a baffle mounted above said moving cutter surface, trap means constituting the rear wall of said baffle for retarding the clay upon said moving cutter surface and for permitting the passage thereon of the stones and refuse matter, and a retarding wall arranged at the front portion of the baffle and extending across the plane of movement of the portion of said cutter surface at the sides of the baffle.

51. In apparatus for separating stones from clay, a moving cutter surface having openings for the passage of the cut clay, a baffle mounted above said moving cutter surface and having convergent side walls, trap means constituting the inlet to the baffle, for retarding the clay upon said moving cutter surface and for permitting the passage thereon of the stones and refuse matter, and a retarding wall arranged at the front portion of the baffle and extending across the plane of movement of the portion of said cutter surface at the sides of the baffle.

52. In apparatus for separating stones from clay, a moving cutter surface having openings for the passage of the cut clay, a baffle mounted above said moving cutter surface and having convergent side walls, trap means comprised in the side walls of the baffle for retarding the clay upon said moving cutter surface and for permitting the passage thereon of the stones and refuse matter, trap means constituting the inlet to the baffle, for retarding the clay upon said moving cutter surface and for permitting the passage thereon of the stones and refuse matter, a retarding wall arranged at the front portion of the baffle and extending across the plane of movement of the portion of said cutter surface at the sides of the baffle, and trap means comprised in said retarding wall for retarding the clay upon said moving cutter surface and for permitting the passage thereon of the stones and refuse matter.

53. In apparatus for separating stones from clay, a moving cutter surface having openings for the passage of the cut clay, a baffle mounted above said moving cutter surface, and inlet means for said baffle constituted by traps for retarding the clay upon said moving cutter surface and for permitting the passage thereon of the stones and refuse matter.

54. In apparatus for separating stones from clay, a moving cutter surface having openings for the passage of the cut clay, and a retarding wall mounted above said cutter surface at an angle with relation to the direction of movement thereof and having a yielding bottom edge to retard the clay upon said moving cutter surface and to permit the passage thereon of the stones and refuse matter.

55. In apparatus for separating stones from clay, a moving cutter surface having openings for the passage of the cut clay, a retarding wall mounted above said cutter surface at an angle with relation to the direction of movement thereof, and trap means at the bottom of said retarding wall to retard the clay upon said moving cutter surface and to permit the passage thereon of the stones and refuse matter.

56. In apparatus for separating stones from clay, a moving cutter surface having openings for the passage of the cut clay, a retarding wall mounted above said cutter surface at an angle with relation to the direction of movement thereof, and means comprised in said wall for retarding the clay upon said moving cutter surface and for permitting the passage thereon of the stones and refuse matter.

57. In apparatus for separating stones from clay, a moving cutter surface operating to cut the clay and thereby separate the clay from the stones and refuse matter and having openings for the passage of the cut clay, cutting edges projecting at said openings for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movemnt of said surface and while the crude clay is subject to the action of the cutter surface.

58. In apparatus for separating stones from clay, a moving cutter surface operating to cut the clay and thereby separate the clay from the stones and refuse matter and having openings extending transversely across said moving surface for the passage of the cut clay, cutting edges projecting at said openings and extending transversely across said surface for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

59. In apparatus for separating stones from clay, a moving cutter surface operating to cut the clay and thereby separate the clay from the stones and refuse matter and having a successive series of openings for the passage of the cut clay, a successive series of cutting edges projecting at said openings for acting upon the clay while it is retarded upon said moving cutter surface, the series arrangement being such that said cutting edges conjointly act upon the retarded clay, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

60. In apparatus for separating stones from clay, a moving cutter surface operating to cut the clay and thereby separate the clay from the stones and refuse matter and having throughout its entire area in the plane of movement successive openings for the passage of the cut clay, cutting edges projecting at each of said openings for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

61. In apparatus for separating stones from clay, a moving cutter surface operating to cut the clay and thereby separate the clay from the stones and refuse matter and having a continuous series of openings for the passage of the cut clay, cutting edges projecting at said openings for acting upon the clay while it is retarded upon said moving cutter surface, the series arrangement being such that said cutting edges conjointly act upon the retarded clay, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

62. In apparatus for separating stones from clay, a moving cutter surface operating to cut the clay and thereby separate the clay from the stones and refuse matter and constituted by transverse strips spaced apart to form openings for the passage of the cut clay, cutting edges projecting at the front of each of said strips at said openings for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

63. In apparatus for separating stones from clay, a moving cutter surface operating to cut the clay and thereby separate the clay from the stones and refuse matter and constituted by transverse strips in a continuous co-acting series and spaced apart to form openings for the passage of the cut clay, cutting edges projecting at the front of said strips in a continuous co-acting series at said openings for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

64. In apparatus for separating stones from clay, a moving cutter surface operating to cut the clay and thereby separate the clay from the stones and refuse matter and having openings for the passage of the cut clay, said surface comprising link members arranged in successive series and cutting edges respectively carried by said link members in series for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

65. In apparatus for separating stones from clay, a moving cutter surface operating to cut the clay and thereby separate the clay from the stones and refuse matter and having openings for the passage of the cut clay, said surface being constituted by sprocket-chains and members having cutting edges and respectively carried by the pivotal elements of said sprocket-chains for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

66. In apparatus for separating stones from clay, a moving cutter surface operating to cut the clay and thereby separate the clay from the stones and refuse matter and having openings for the passage of the cut clay, said surface being constituted by link members arranged in series at each side and cross-strips carrying cutting edges projecting at their front and respectively carried by each of the opposite pairs of link members and spaced apart, whereby said cutting edges act in continuous successive series upon the clay while it is carried upon said moving cutter surface, and means for maintaining the carriage of the stones and refuse matter upon said cutter surface in a continuous movement to a point of deposit therefrom as they are separated from the crude clay in a simultaneous and continuous action during the movement of said surface and while the crude clay is subject to the action of the cutter surface.

67. In apparatus for separating stones from clay, a flexible moving cutter surface having a platform portion constituting a traveling carrier for the stones and refuse matter and having openings for the passage of the cut clay, means for retaining the crude clay subject to the action of the operative cutting portion of said surface, means for permitting the carriage of the stones and refuse matter upon the cutter surface beyond the operative cutting portion thereof and to a point of deposit therefrom as they are separated from the crude clay in a simultaneous and continuous action during the movement of said surface, and means for sustaining and guiding the operative platform portion of said flexible cutter surface in its simultaneous action both at the operative cutting portion for separating the stones and refuse matter from the clay and at its portion upon which the stones and refuse matter are carried to a point of deposit beyond said operative cutting portion.

68. In apparatus for separating stones from clay, a flexible moving cutter surface having a platform portion constituting a traveling carrier for the stones and refuse matter and having openings for the passage of the cut clay, means for retaining the crude clay subject to the action of the operative cutting portion of said surface, means for permitting the carriage of the stones and refuse matter upon the cutter surface beyond the operative cutting portion thereof and to a point of deposit therefrom as they are separated from the crude clay in a simultaneous and continuous action during the movement of said surface, and an open guide frame underlying the operative platform portion of said flexible cutter surface and sustaining the same in its action both at the operative cutting portion for separating the stones and refuse matter from the clay and at its portion upon which the stones and refuse matter are carried to a point of deposit beyond said operative cutting portion.

69. In apparatus for separating stones from clay, a moving cutter surface having a platform portion operating to cut the clay and thereby separate the clay from the stones and refuse matter and constituting a carrier for the stones and refuse matter and having openings for the passage of the cut clay, said cutter and carrier surface being constituted by an endless belt having a continuous series of spaced cutting edges for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

70. In apparatus for separating stones from clay, a moving cutter surface having a platform portion operating to cut the clay and thereby separate the clay from the stones and refuse matter and constituting a carrier for the stones and refuse matter, said cutter and carrier surface being constituted by an endless belt comprising a continuous series of cutting edges extending transversely across said surface and spaced apart to form openings therein for the passage of the cut clay and for acting upon the clay while it is retarded upon said moving cutter surface, and means for maintaining the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

71. In apparatus for separating stones from clay, a moving cutter surface having a platform portion operating to cut the clay and thereby separate the clay from the stones and refuse matter and constituting a carrier for the stones and refuse matter, said cutter and carrier surface being constituted by an endless belt comprising strips extending transversely across said surface and arranged in successive series and spaced apart to form openings for the passage of the cut clay and cutting edges carried by said transverse strips in series and extending across said surface and projecting at said intermediate openings for acting upon the clay while it is retarded upon said moving cutter surface, and means for maintaining the carriage of the stones and refuse matter upon said cutter surface in a continuous movement to a point of deposit therefrom as they are separated from the crude clay in a simultaneous and continuous action during the movement of said surface and while the crude clay is subject to the action of the cutter surface.

72. In apparatus for separating stones from clay, a moving cutter surface operating to cut the clay and thereby separate the clay from the stones and refuse matter and constituting a carrier for the stones and refuse matter and having openings for the passage of the cut clay, said cutter and carrier surface comprising members arranged in series and pivotally mounted with relation to each other and having cutting edges projecting intermediately of the respective pivotally-mounted members for acting upon the clay while it is retarded upon said moving cutter surface, whereby in the pivotal action of said members said cutter and carrier surface has an opening action at said cutting edges, and means for maintaining the carriage of the stones and refuse matter upon said cutter surface in a continuous movement to a point of deposit therefrom as they are separated from the crude clay and while the latter is subject to the action of the cutter surface.

73. In apparatus for separating stones from clay, a moving cutter surface operating to cut the clay and thereby separate the clay from the stones and refuse matter and constituting a carrier for the stones and refuse matter and having openings for the passage of the cut clay, said cutter and carrier surface comprising cutting edges for acting upon the clay while it is retarded upon said moving cutter surface and pivotally-mounted with relation to each other so that in the pivotal movement of said cutting edges said cutter and carrier surface has an opening action at said cutting edge portion, and means for maintaining the carriage of the stones and refuse matter upon said cutter surface in a continuous movement to a point of deposit therefrom as they are separated from the crude clay and while the latter is subject to the action of the cutter surface.

74. In apparatus for separating stones from clay, a moving cutter surface having a platform portion constituting a traveling carrier for the stones and refuse matter and comprising cross-strips arranged in successive series and respectively pivotally-mounted and spaced apart to form openings for the passage of the cut clay and respectively carrying cutting edges projecting at said intermediate openings, and means for maintaining the carriage of the stones and refuse matter upon said moving cutter surface to a point of deposit therefrom.

75. In apparatus for separating stones from clay, a flexible moving cutter surface having openings for the passage of the cut clay, means for maintaining said flexible cutter surface in operative status in a direct plane for its action upon the clay, and means for carrying said flexible cutter surface in a movement in the arc of a circle to deposit the stones and refuse matter therefrom.

76. In apparatus for separating stones from clay, a flexible moving cutter surface having openings for the passage of the cut clay and comprising cutting edges arranged in successive series and respectively pivotally mounted, means for maintaining said cutting members at the operative portion of said cutter surface in a direct plane for their action upon the clay, and means for moving said cutting members pivotally to discharge the stones and refuse matter.

77. In apparatus for separating stones from clay, a flexible moving cutter surface comprising cross-strips arranged in successive series and respectively pivoted and spaced apart to form openings for the passage of the cut clay and having cutting edges projecting at said intermediate openings, means for maintaining said cross-strips at the operative portion of the flexible cutter surface in a direct plane for their action upon the clay, and means for moving said cross-strips pivotally to enlarge said intermediate openings for the discharge of the stones and refuse matter.

78. In apparatus for separating stones from clay, a flexible moving cutter surface constituting a traveling carrier for the stones and refuse matter and comprising relatively-pivoted members spaced apart to form openings for the passage of the cut clay, means for carrying said flexible cutter surface in a movement in the arc of a circle to enlarge said intermediate openings to deposit the stones and refuse matter, and means for maintaining the carriage of the stones and refuse matter upon said moving cutter surface to the point of deposit therefrom.

79. In apparatus for separating stones from clay, a flexible moving cutter surface constituting a traveling carrier for the stones and refuse matter and comprising chains and cutting members respectively carried by the chain links in successive series and spaced apart to form openings for the passage of the cut clay, a drum member around which said links pass, whereby said intermediate openings are enlarged when said cutter surface moves in the arc of a circle, and means for maintaining the carriage of the stones and refuse matter upon said moving cutter surface to the point of deposit therefrom.

80. In apparatus for separating stones from clay, a moving cutter surface constituting a traveling carrier for the stones and refuse matter and having openings for the passage of the cut clay, means for enlarging said openings at a determined point in the travel of said cutter surface, and means for maintaining the carriage of the stones and refuse matter upon said moving cutter surface to a point of deposit.

81. In apparatus for separating stones from clay, a moving cutter surface having openings for the passage of the cut clay, means for holding and retaining the crude clay in contact with the operative portion of said cutter surface, means for maintaining said openings at normal size during the operative action upon the crude clay, and means for enlarging said openings at a determined point in the travel of the cutter surface to discharge the stones and refuse matter.

82. In apparatus for separating stones from clay, a moving cutter surface having openings for the passage of the cut clay, means for holding and retaining the crude clay in contact with the operative portion of said cutter surface, means for retaining the stones and refuse matter upon said cutter surface during the travel of the operative portion thereof, whereby the clay is acted upon and deposited through the cutter surface while the stones and refuse matter are carried thereby, and means for enlarging said openings in the cutter surface at a determined point in the travel thereof to discharge any stones or refuse matter lodged in said openings.

83. In apparatus for separating stones from clay, a moving cutter surface having openings for the passage of the cut clay, means for maintaining said openings at normal size during the operative action upon the crude clay, means for holding and retaining the crude clay in contact with the operative portion of said cutter surface, means for retaining the stones and refuse matter upon said cutter surface during the travel of the operative portion thereof, whereby the clay is acted upon and deposited through the cutter surface while the stones and refuse matter are carried thereby, and means for enlarging said openings in the cutter surface at a determined point in the travel thereof to discharge any stones or refuse matter lodged in said openings.

84. In apparatus for separating stones from clay, a moving cutter surface operating to cut the clay and thereby separate the clay from the stones and refuse matter and constituting a carrier for the stones and refuse matter, said cutter and carrier surface comprising members extending transversely across said surface and spaced apart to form openings for the passage of the cut clay, cutting edges adjustable forwardly upon said transverse members and extending transversely across said surface with relation to said openings for acting upon the crude clay while it is retarded upon said moving cutter surface, and means for permitting the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

85. In apparatus for separating stones from clay, a moving cutter surface operating to cut the clay and thereby separate the clay from the stones and refuse matter and constituting a carrier for the stones and refuse matter and having openings for the passage of the cut clay, cutting edges adjustable in a projecting position with relation to said openings for acting upon the crude clay while it is retarded upon said cutter and carrier surface, and means for permitting the carriage of the stones and refuse matter upon said cutter surface in a continuous movement beyond the operative cutting portion of said surface and to a point of deposit therefrom as they are separated from the crude clay in a simultaneous and continuous action during the movement of said surface and while the crude clay is subject to the action of the cutter surface.

86. In apparatus for separating stones from clay, a moving cutter surface operating to cut the clay and thereby separate the clay from the stones and refuse matter and constituting a carrier for the stones and refuse matter and having openings for the passage of the cut clay, knives carried by said surface and projecting at said openings and having the plane of their cutting edges corresponding to the plane of said cutter and carrier surface and projecting above the same, and means whereby said surface operates to cut the clay and carry the stones and refuse matter beyond the operative cutting portion of said surface as they are separated from the crude clay in a simultaneous and continuous action during the movement of said surface.

87. An apparatus for separating stones from clay, comprising a moving cutter surface operating to cut the clay and thereby separate the clay from the stones and refuse matter, means for maintaining a continuous successive action of said cutter surface upon the crude clay, means for separately collecting and depositing the clay cuttings, and means for separately collecting the stones and refuse matter in a continuous movement as they are separated from the crude clay in a simultaneous and continuous action during the movement of said surface and while the crude clay is subject to the action of the cutter surface and for the carriage of the stones and refuse matter to a point of deposit.

88. An apparatus for separating stones from clay, comprising a moving cutter surface operating to cut the clay and thereby separate the clay from the stones and refuse matter, means for maintaining a continuous successive action of said cutter surface upon the crude clay, means for separately collecting and depositing the clay cuttings, and means for separately collecting the stones and refuse matter in a continuous movement as they are separated from the crude clay in a simultaneous and continuous action during the movement of said surface and while the crude clay is subject to the action of the cutter surface and for maintaining the carriage of the stones and refuse matter upon the cutter surface in a continuous movement to a point of deposit therefrom.

89. An apparatus for separating stones from clay, comprising a moving cutter surface operating to cut the clay and thereby separate the clay from the stones and refuse matter and having openings for the passage of the cut clay, means for maintaining a continuous successive action of said cutter surface upon the crude clay, and means for separately collecting the stones and refuse matter in a continuous movement as they are separated from the crude clay in a simultaneous and continuous action during the movement of said surface and while the crude clay is subject to the action of the cutter surface and for maintaining the carriage of the stones and refuse matter upon the cutter surface in a continuous movement to a point of deposit therefrom.

90. An apparatus for separating stones from clay, comprising a moving cutter surface operating to cut the clay and thereby separate the clay from the stones and refuse matter, means for maintaining a continuous successive action of said cutter surface upon the crude clay, means for separately collecting and depositing the clay cuttings, means for separately collecting the stones and refuse matter in a continuous movement upon the cutter surface as they are separated from the crude clay in a simultaneous and continuous action during the movement of said surface and while the crude clay is subject to the action of the cutter surface, and means for releasing the stones and refuse matter from said moving cutter and carrier surface at a point of their carriage in a continuous movement thereon.

91. An apparatus for separating stones from clay, comprising a moving cutter surface for shaving the crude clay, means for maintaining the crude clay in contact with said moving cutter surface, said cutter surface having openings for the passage of the clay shavings through said refuse during the operative action thereof, means for maintaining the carriage of the stones and refuse matter upon said cutter surface to a separate point of deposit, and means whereby said openings in the cutter surface are enlarged after the shaving action upon the crude clay to release the stones and refuse matter lodged in said openings.

92. An apparatus for separating stones from clay, comprising a surface moving continuously in one direction and constituting a combined cutter and carrier, said surface being provided with cutters for cutting the crude clay and thereby separating the clay from the stones and refuse matter and having openings for the passage of the cut clay, and means whereby in the operation of said cutter and carrier surface the clay cuttings are deposited through said surface and the stones and refuse matter are separately collected and carried upon said surface beyond the operative cutting portion thereof as they are separated from the crude clay in a simultaneous and continuous action during the travel of said cutter and carrier surface.

93. An apparatus for separating stones from clay, comprising a surface moving continuously in one direction and constituting a combined cutter and carrier, said surface being provided with cutters for cutting the crude clay and thereby separating the clay from the stones and refuse matter and having openings for the passage of the cut clay, means for retarding the crude clay during the action thereon of said moving cutter surface and during the separation therefrom of the stones and refuse matter, and means whereby in the operation of said cutter and carrier surface the clay cuttings are deposited through said surface and the stones and refuse matter are separately collected and carried upon said surface beyond the operative cutting portion thereof as they are separated from the crude clay in a simultaneous and continuous action during the travel of said cutter and carrier surface.

94. An apparatus for separating stones from clay, comprising a moving surface traveling continuously in one direction and constituting a combined cutter and carrier, said surface being provided with cutters for shaving the crude clay, and with openings for the passage of the clay shavings, and means for retarding the clay during the action thereon of said moving cutter surface and for releasing and permitting the passage of the stones and refuse matter beyond the operative cutting portion in their carriage upon said moving carrier surface, during the continuous travel of said cutter and carrier surface, whereby the clay shavings are deposited through said surface during its continuous line of travel and the stones and refuse matter are retained and carried thereon beyond said retarding means to a separate point of deposit.

95. An apparatus for separating stones from clay, comprising a moving cutter and carrier surface, means for retaining the crude clay in contact with and subject to the action of said cutter surface during the travel thereof, means for retaining the stones and refuse matter upon and subject to the action of said carrier surface during the travel thereof, and means whereby the cut clay and the stones or refuse matter are separately and simultaneously deposited from said cutter and carrier surface during the travel thereof.

96. An apparatus for separating stones from clay, comprising a moving cutter and carrier surface operating to cut the clay and thereby separate the clay from the stones and refuse matter, a hopper having its bottom constituted by said moving cutter and carrier surface, means for simultaneously maintaining the crude clay subject to the action of said surface and for permitting the carriage thereon of the stones and refuse matter as they are separated therefrom in a simultaneous and continuous action during the travel of said surface, and means whereby the cut clay and the stones and refuse matter are separately and simultaneously deposited from said cutter and carrier surface during the continuous travel thereof.

97. An apparatus for separating stones from clay, comprising a moving cutter and carrier surface operating to cut the clay and thereby separate the clay from the stones and refuse matter and having openings for the passage of the cut clay, a hopper having its bottom constituted by said moving cutter and carrier surface, means for simultaneously maintaining the crude clay subject to the action of said surface and for permitting the carriage thereon of the stones and refuse matter as they are separated therefrom during the continuous travel of said surface, and means whereby the cut clay and the stones or refuse matter are separately and simultaneously deposited from said cutter and carrier surface during the continuous travel thereof.

98. An apparatus for separating stones from clay, comprising a moving cutter and carrier surface operating to cut the clay and thereby separate the clay from the stones and refuse matter, and means whereby said surface operates to cut the clay and carry the stones and refuse matter beyond the operative cutting portion of said surface as they are separated from the crude clay in a simultaneous and continuous action during the movement of said surface.

99. An apparatus for separating stones from clay, comprising a moving cutter surface, means for maintaining the crude clay subject to the action of said surface, and means for releasing and passing the stones and refuse matter beyond the operative cutting portion and from said surface as they are separated from the crude clay and while the latter is subject to the action of said surface in a simultaneous and continuous action during the travel of said surface.

100. An apparatus for separating stones from clay, comprising a moving surface operating to cut the clay and thereby separate the clay from the stones and refuse matter, means for maintaining the crude clay and separated stones and refuse matter upon said surface during the movement thereof and action on the crude clay, means for retarding the clay subject to the action of said surface, and means for releasing and permitting the carriage of the stones and refuse matter beyond the operative cutting portion of said surface as they are separated from the retarded crude clay and to a point of deposit in a simultaneous and continuous action during the operative movement of said surface and while the crude clay is subject to the action thereof.

101. In apparatus for separating stones from clay, a feed hopper having a moving bottom carrying cutting means and operating to cut the clay and thereby separate the clay from the stones and refuse matter and constituting a carrier for the stones and refuse matter and having openings for the passage of the cut clay, and means operated by the stones on the carrier for the discharge of the stones from the hopper as they are moved on the carrier.

In testimony whereof I have signed my name in the presence of the subscribing witnesses.

ROBERT W. LYLE.

Witnesses:
  GEO. M. BURRELL,
  H. CHAPMAN.